United States Patent [19]

Peterson et al.

[11] Patent Number: 4,502,756
[45] Date of Patent: Mar. 5, 1985

[54] BANDPASS FILTER FORMED BY SERIAL GRATINGS OPERATING IN A WOOD'S ANOMALY REGION

[75] Inventors: Phillip R. Peterson; Athanasios Gavrielides, both of Albuquerque, N. Mex.

[73] Assignee: The United States of America as represented by the Secretary of the Navy, Washington, D.C.

[21] Appl. No.: 431,865

[22] Filed: Sep. 30, 1982

[51] Int. Cl.³ .............................................. G02B 5/18
[52] U.S. Cl. ............................ 350/162.2; 350/162.17
[58] Field of Search ......................... 350/162.17, 162.2

[56] References Cited

U.S. PATENT DOCUMENTS 2,945,953  7/1960  Martin .................................. 250/43.5
4,088,884  5/1978  Rast et al. ............................ 350/311
4,330,211  5/1982  Peterson et al. ................. 350/162.17

OTHER PUBLICATIONS

Harrison and Stroke, "Attainment of High Resolution with Diffraction Gratings and Echelles, " JOSA, Dec. 1960, vol. 50, No. 12, pp. 1153–1158.
Stroke and Stroke, "Tandem Use of Gratings and Echelles to Increase Resolution, Huminosity, and Compactness of Spectrometers and Spectrographs," JOSA, Mar. 1963, vol. 53, No. 3, pp. 333–338.
Hessel and Oliner, "A New Theory of Wood's Anomalies on Optical Gratings," Applied Optics, Oct. 1965, vol. 4, No. 10, pp. 1275–1297.
Palmer, "Parallel Diffraction Gratings Anomalier," JOSA, Apr. 1952, vol. 42, No. 4, pp. 269–276.
Palmer, "Diffraction Grating Anomalies II, Coarse Gratings," JOSA, Jan. 1956, vol. 46, No. 1, pp. 50–53.
Gavrielides and Peterson, "Diffraction by Lamellar Gratings," AFWL-TR-79-46, May 1979.

Primary Examiner—Bruce Y. Arnold
Assistant Examiner—William Propp
Attorney, Agent, or Firm—Donald J. Singer; John R. Flanagan

[57] ABSTRACT

A bandpass filter is comprised by a plurality of reflection gratings operating in a Wood's anomaly region and arranged in serial relationship. Specifically, the gratings are serially arranged in two substantially parallel rows with the gratings in the first row offset laterally from the gratings in the second row. Further, the input to each grating is at substantially the same angle of incidence such that the output of one grating is the direct input to the next succeeding one of the gratings.

1 Claim, 5 Drawing Figures

BANDPASS FILTER FORMED BY SERIAL GRATINGS OPERATING IN A WOOD'S ANOMALY REGION

RIGHTS OF THE GOVERNMENT

The invention described herein may be manufactured and used by or for the Government of the United States for all governmental purposes without the payment of any royalty.

BACKGROUND OF THE INVENTION

1. Field of the Invention

The present invention broadly relates to bandpass filters and, more particularly, is concerned with the provision of a bandpass filter from a serial arrangement of reflection gratings operating in a Wood's anomaly region.

2. Description of the Prior Art

Filters are an important part of optical and electro-optical technology. They control spectral energy in applications ranging from spectrometry to optical communication systems.

U.S Pat. No. 2,945,953 to Martin discloses an arrangement of multiple gratings and mirrors for performing a filtering function in an infrared monochromotor. Harrison and Stroke in an article entitled "Attainment of High Resolution with Diffraction Gratings and Echelles" (*Journal of the Optical Society of America*, Dec. 1960, vol. 50, No. 12, pp. 1153–1158) propose an experimental spectrograph setup in which two echelles are arranged in series for performing a filtering function. Stroke and Stroke in an article entitled "Tandem Use of Gratings and Echelles to Increase Resolution, Luminosity, and Compactness of Spectrometers and Spectrographs," (*Journal of the Optical Society of America,* Mar. 1962, vol. 53, no. 3, pp. 333–338) trace the history of the use of tandem (series) arrangements of spectroscopic elements and report experimental results using two gratings in tandem in spectrograph arrangements. U.S. Pat. No. 4,088,884 to Rast et al discloses a filter having a serial arrangement of mirrors used in an optical communication system.

While the filter arrangements of the aforementioned patents and publication may satisfactorily perform their intended functions in the specific applications for which they were designed, a need exists for a bandpass filter having broader, more generalized, application and utility.

SUMMARY OF THE INVENTION

The present invention provides a bandpass filter formed by serially-arranged reflection gratings operating in a Wood's anomaly region which is designed to satisfy the aforementioned needs. The device of the present invention uses a series of reflection gratings all operating in the vicinity of Wood's anomaly such that after an incident beam of light, composed of many wavelengths, traverses the serial gratings the output beam is composed of fewer wavelengths. Thus, this device acts as a bandpass filter operating in a Wood's anomaly region.

Accordingly, the present invention is directed to a bandpass filter comprising a plurality of reflection gratings, with the gratings operating in a Wood's anomaly region and being arranged in serial relationship such that the output of a given one of said gratings is the direct input to the next succeeding one of the gratings. More particularly, the gratings are serially arranged in two substantially parallel rows with the gratings in the first row offset laterally from the gratings in the second row. Further, the input to each grating is at substantially the same angle of incidence.

DETAILED DESCRIPTION OF THE INVENTION

In the diffraction of certain radiation from a reflection grating there occurs rapid variations in the intensity of various diffracted orders in a narrow wavelength range and in a narrow range in the angle of incidence. These rapid variations are the so-called Wood's anomalies which have been investigated both theoretically by Hessel and Oliner (see "A New Theory of Wood's Anomalies on Optical Gratings," *Applied Optics,* Oct. 1965, vol. 4, no. 10, pp. 1275–1297) and experimentally by Palmer (see "Parallel Diffraction Grating Anomalies," *Journal of the Optical Society of America,* Apr. 1952, vol. 42, no. 4, pp. 269–276; and "Diffraction Grating Anomalies. II. Course Gratings," *Journal of the Optical Society of America,* Jan. 1956, vol. 46, no. 1, pp. 50–53).

The anomalies appear only where the incident light is polarized. If the grating grooves (or rulings) are shallow (less than one wavelength deep) anomalies may be expected to appear only for that polarization of the light for which its electric vector is perpendicular to the grooves; deep grooves, on the other hand, may show anomalies in both polarizations, i.e., in instances where the electric vector is either perpendicular or parallel to the grooves.

Figure 1:
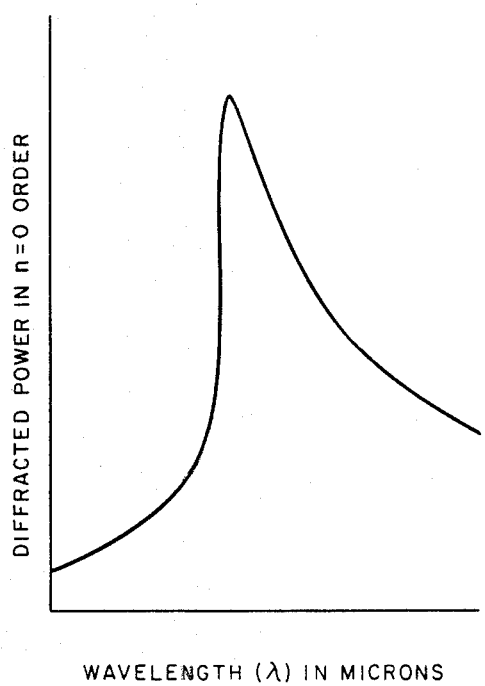
FIG. 1 is a graph of Wood's anomaly diffraction in the n=0 order from one grating as a function of wavelength.

Referring now to the drawings, and more particularly to FIG. 1, there is depicted the graph of a typical Wood's anomaly diffraction efficiency (diffracted power in n=0 order) as a function of the wavelength of incident radiation. The graph demonstrates that at a fixed angle of incidence for one grating the anomaly is manifested in a rapid increase in the efficiency.

The present invention proposes to form a bandpass filter (see FIG. 2) by placing several gratings in series such that the output from the first grating, such as shown in FIG. 1, is the input for the second grating and then repeat this process several more times. Thus, after exiting a series of gratings the net output is the product of the graph or curve shown in FIG. 1 taken with itself. The number of products forming the output is equal to the number of gratings. This process then yields a much sharper and narrower curve representing the resultant bandpass filter (see FIG. 4). Thus, by using a series of gratings all operating in the vicinity of a Wood's anomaly, an incident beam composed of many wavelengths will be composed of fewer wavelengths after traversing the series of gratings. In such manner, the series of gratings act as a bandpass filter operating in a Wood's anomaly region.

Applicants herein previously have developed an efficient computer code for design of finite conducting lamellar gratings to be irridated by plane waves. This previous work is described in "Diffraction by Lamellar Gratings," by A. Gavrielides and P. R. Peterson, Air Force Weapons Laboratory Report No. AFWL-TR-79-46, dated May 1979 which is incorporated herein by reference.

The application of the design code of the above-referenced report to the Wood's anomaly in arriving at an exemplary embodiment of the Wood's anomaly series gratings bandpass filter, generally designated 10, of FIG. 2 will now be discussed.

There are two independent solutions for the diffracted power from lamellar gratings, depending on the two independent polarization directions of the incident beam. These polarization directions are Transverse Electric (the electric field parallel to the grating grooves) and Transverse Magnetic (the magnetic field parallel to the grooves). As a working embodiment of the Wood's anomaly series gratings bandpass filter, the Transverse Magnetic polarization state was chosen since Wood's anomalies are sharper for Transverse Magnetic than for Transverse Electric polarization states.

Figure 3:
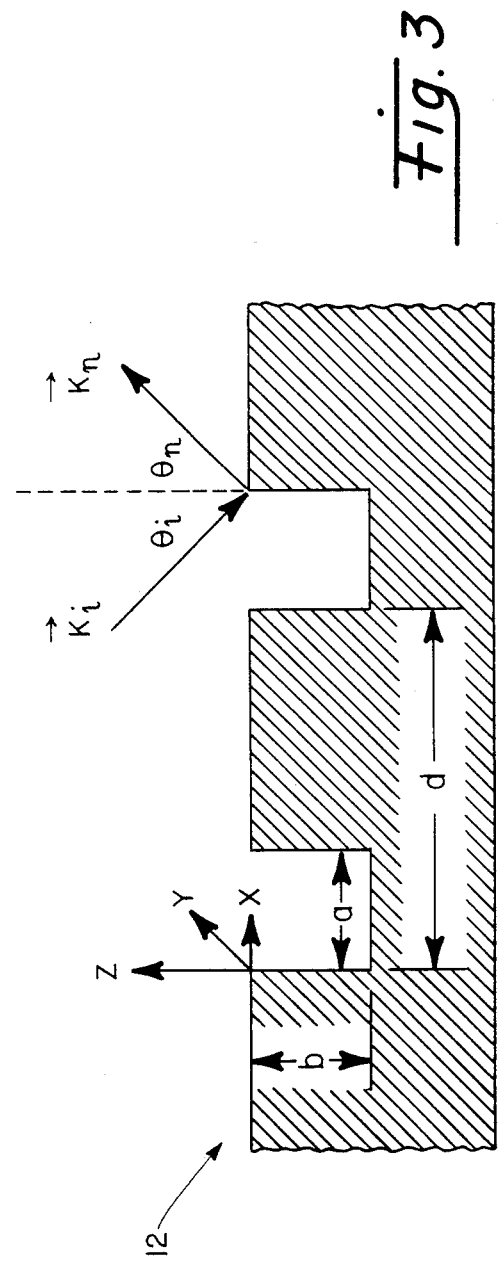
FIG. 3 is an enlarged fragmentary cross-sectional view of one of the Wood's anomaly diffraction gratings used in the bandpass filter of FIG. 2, showing the groove profile and plane of incidence of the grating.

The equations used to obtain the diffracted power distribution are contained in the sections of the above-cited report entitled "Transverse Electric" and "Transverse Magnetic." In explaining the use of these equations it is helpful to refer to FIG. 3 of the drawings herein which is identical to FIG. 1 in the report. The notation is that (x,y,z) define the coordinate system (as is used in Eq. (18)), d=period, b=depth, a=width, $\theta_i$= the angle of incidence (positive to the left of the grating normal), and $\theta_n$= the diffraction angle (negative to the left of the normal).

In the following, the method of the report used to solve the Wood's anomaly series gratings bandpass filter as well as the final solution parameters (given in parenthesis) are presented.

There are two types of Wood's anomalies of which the leitmotif is the rapid variation in the amplitudes of the diffracted spectral orders. These two types are the onset or disappearance of a particular spectral order and a resonance type of behavior, normally characteristic of a waveguide. In lamellar gratings the two anomalies are superimposed. This then is the starting point of the method.

Figure 5:
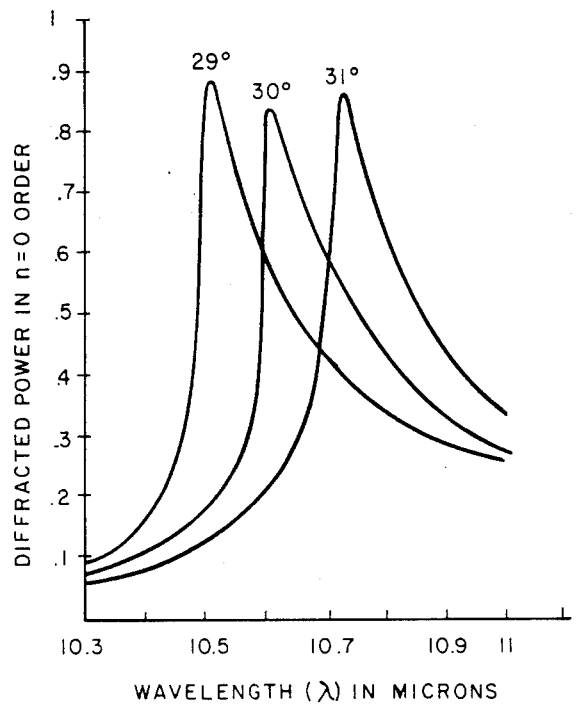
FIG. 5 is a series of graphs of Wood's anomaly diffraction in the n=0 order from one grating as a function of wavelength for incident angles of 29°, 30°, and 31°.

Consider that the incident radiation is to have wavelengths in the range of 10.0 to 11.0 $\mu$m, at an angle of incidence of $\theta_i$= 30° (which is commensurate with a pre-existing experimental situation), and polarized with the magnetic field parallel to the grating grooves (this is the Transverse Magnetic case). Now Eq. (2) is employed to find a valve of the period (d=14.1333 $\mu$m) when the number of orders change (n=−2, −1, to 0; n=−1,0). Thus, this should be located in a Wood's anomaly region. Next, a depth (b=5.6533 $\mu$m) and width (a=2.8266 $\mu$m) and width (a=2.8266 $\mu$m) are chosen. Now the diffracted efficiencies may be obtained. This is done by solving the matrix equation, Eq. (10), with the accompanying definitions Eq. (2), (3), (5), and Eq. (20)-(24) for the above determined parameters. This gives the diffraction amplitudes $A_n$ for given $\lambda$, $\theta$, b, d and a. Next, vary the wavelength to obtain the diffraction efficiency $P(\lambda)=(A_o(\lambda))^2 \rightarrow P_o(\lambda) = |A_o(\lambda)|^2$, for the n=0 order as a function of the angle of incidence as is shown in FIG. 5. When the gratings are in series as is shown in FIG. 2 the net output efficiency is the product $(P_o(\lambda))^{10}$, which is depicted in FIG. 4 with a bandwidth of 350A°.

The method of the report, therefore, gives the diffraction efficiency as a function of the wavelength, as shown in FIG. 5, for a single grating of period, d=14.1333 $\mu$m; depth, b=5.6533 $\mu$m and width, a=2.82666 $\mu$m, and incidence angle of 30°. For this profile and wavelength range there is a −1 order diffracted at angles greater than 11° and a −2 order diffracted at angles greater than 66° back into the same quadrant as the incident beam.

Figure 2:
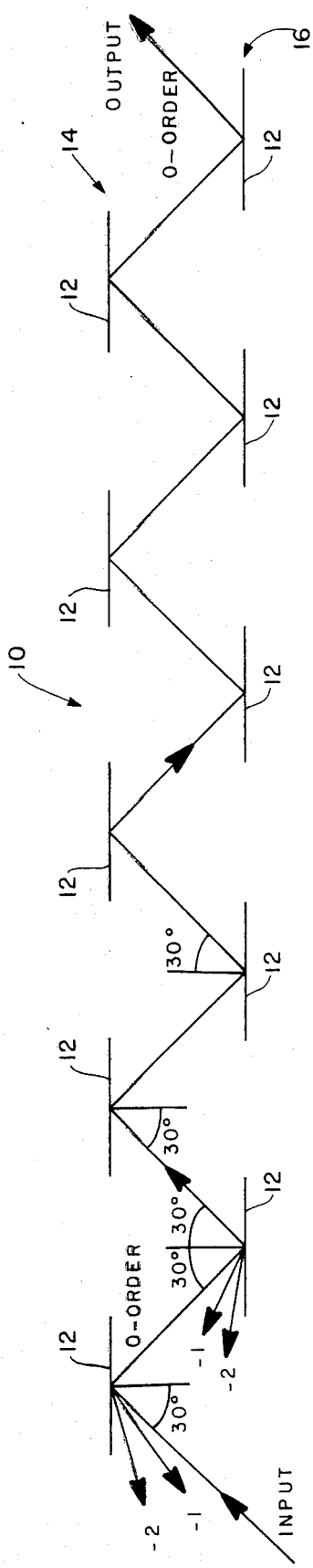
FIG. 2 is a schematic representation of an exemplary embodiment of the Wood's anomaly series gratings bandpass filter of the present invention wherein the filter is comprised of ten gratings.

In the exemplary embodiment of the bandpass filter 10 of FIG. 2, one can see the back-diffraction of the −1 and −2 orders as well as the transmission of the 0-order. The number of serially-arranged gratings 12 is arbitrarily chosen to be ten; there could be more or less. Furthermore, the gratings 12 are serially-arranged in two parallel rows 14 and 16, with the gratings 12 in the first row 14 offset laterally from the gratings 12 in the second row 16. The grooves on the respective gratings in each row face the grooves on the gratings in the opposite row.

Figure 4:
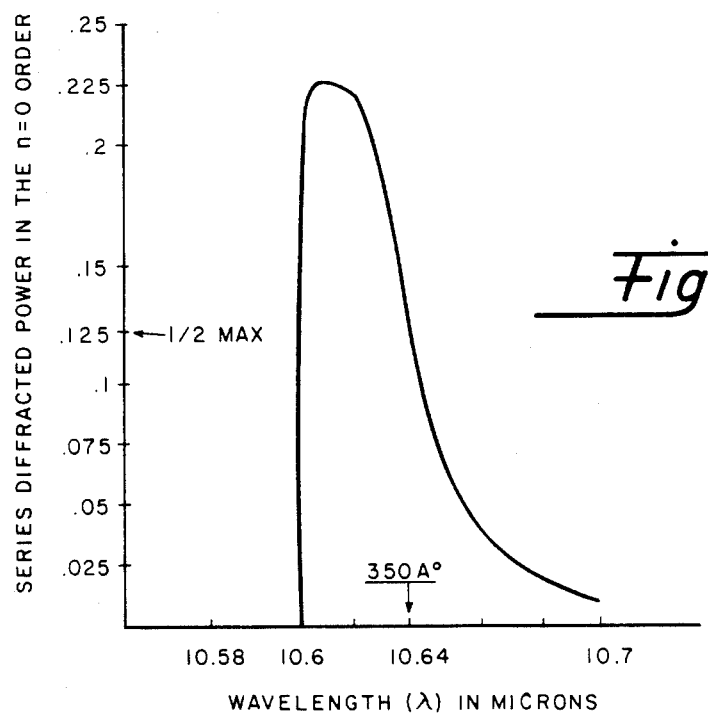
FIG. 4 is a graph of Wood's anomaly series diffraction for the n=0 order as a function of wavelength for ten gratings.

For this configuration, the output is shown in FIG. 4, which is the 30° curve in FIG. 5 multiplied by itself ten times. It is seen that this device has a sharp cutoff at 10.6 $\mu$m and a bandwidth of 350A° with a peak transmittance of about 22.5%. Increasing the number of gratings will decrease the bandwidth and the peak transmittance.

Also, FIG. 5 shows the efficiency curves for angles of incidence of 29° and 31°. The important point here is that the peaks are shifted by about ±0.1 $\mu$m from the 30° curve and still retain the Wood's anomaly feature. So, if the incidence angle is changed to 29° or 31°, the cutoff wavelength, after traversing the series gratings 12 of the filter in FIG. 2, shifts to 10.5 $\mu$m and gives a shifted curve similar to that shown in FIG. 5. Thus, the device 10 can act as a scanning bandpass filter just by varying the incidence angle.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

Having thus described the invention, what is claimed is:

1. A bandpass filter, comprising:
  (a) a plurality of reflection gratings;
  (b) said gratings being conductive and operating in a Wood's anomaly region;
  (c) said gratings being arranged in serial relationship in two substantially parallel rows with the gratings in the one row being offset laterally from the gratings in the other row and the input to each grating being at substantially the same angle of incidence such that the output from a given one of said gratings in one row is the direct input to the next succeeding one of said gratings in the other row;

(d) said gratings being adapeed to receive polarized radiation and having grooves arranged substantially parallel to the magnetic field of said radiation; and (e) said gratings being adapted to transmit the zeroth-order of diffraction of said polarized radiation but not the nonzero-orders of diffraction.

* * * * *

UNITED STATES PATENT AND TRADEMARK OFFICE
CERTIFICATE OF CORRECTION

PATENT NO. : 4,502,756
DATED : March 5, 1985
INVENTOR(S) : Phillip R. Peterson et al It is certified that error appears in the above-identified patent and that said Letters Patent is hereby corrected as shown below:

In the Assignee Name,

"The United States of America as represented by the Secretary of the Navy, Washington, D.C."

SHOULD BE:

--United States of America, as represented by the

Secretary of the United States Air Force--.

Signed and Sealed this

Twenty-ninth Day of October 1985

[SEAL]

Attest:

DONALD J. QUIGG

Attesting Officer

Commissioner of Patents and
Trademarks—Designate